Jan. 31, 1928.  
C. DELAYGUE  
1,657,460

REFRIGERATING APPARATUS

Original Filed March 25, 1924    2 Sheets-Sheet 1

Inventor  
Charles Delaygue  
By Robt Robt for Hill  
Attorneys

Jan. 31, 1928. 1,657,460
C. DELAYGUE
REFRIGERATING APPARATUS
Original Filed March 25. 1924  2 Sheets-Sheet 2
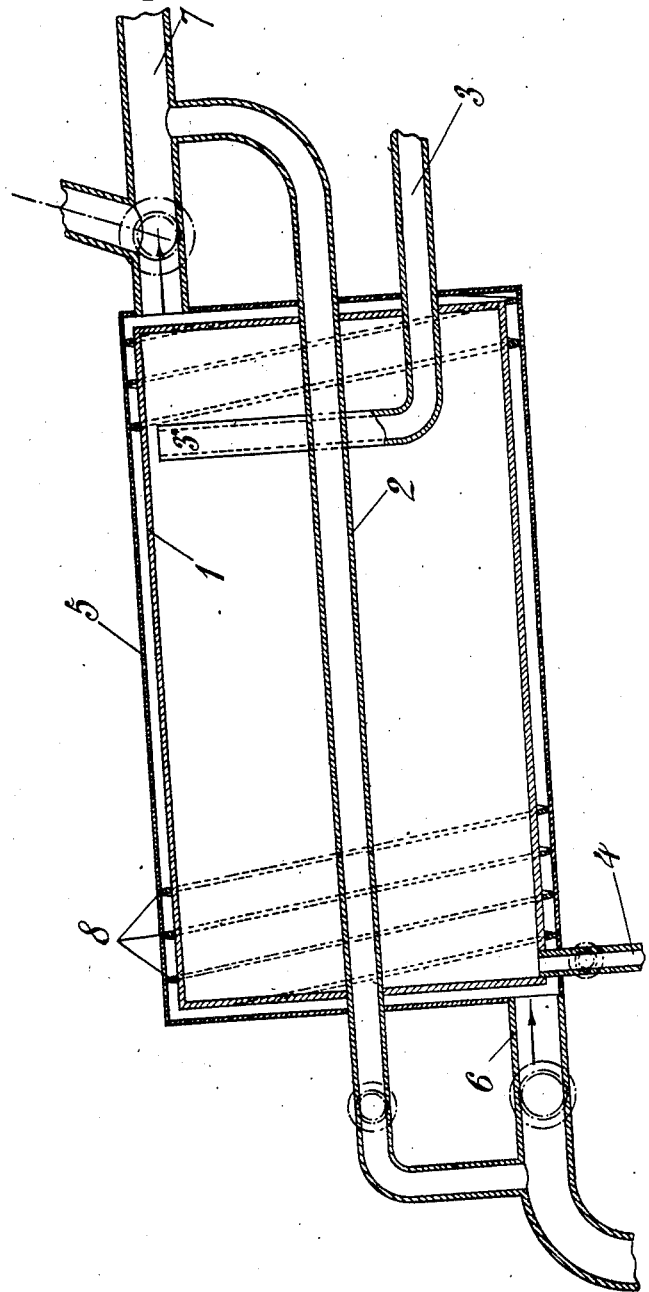

Patented Jan. 31, 1928.

1,657,460

UNITED STATES PATENT OFFICE.

CHARLES DELAYGUE, OF PARIS, FRANCE.

REFRIGERATING APPARATUS.

Original application filed March 25, 1924, Serial No. 701,756. Divided and this application filed September 22, 1925. Serial No. 57,983.

This invention relates to refrigerating apparatus of the reversing absorption type intended for the production of cold for domestic use.

The object of the present invention is to improve the form of condenser-evaporator suitable for such apparatus, and includes a cylindrical condenser-evaporator comprising an outer vessel and an inner vessel, a pipe opening into the space between said outer and inner vessels by which the gas enters for condensation and by which the gas leaves after evaporation, and an internal jacket open at its top and bottom and positioned to envelope the walls of the inner vessel.

In order that the said invention may be fully understood and readily carried into effect, an example thereof will now be described with reference to and illustrated in the accompanying drawings, in which:—

Figure 4 is a diagrammatical sectional elevation of another condenser.

This application comprises a division of my application which eventuated into Patent 1,602,147, dated Oct. 5, 1926, in which the condenser is shown as comprising an internal cylinder with a jacket of relatively small diameter at the bottom and over a relatively great height and of relatively great diameter towards the top and over a relatively small height. This arrangement is adapted to maintain in the condenser as long as possible the greatest possible height of the liquefied gas, and thus the greatest possible length of indirect contact with the water or the substances to be congealed contained in the internal hollow cylinder, because such substances only undergo the cooling required for their freezing up to the height which the liquefied gas attains and the efficiency of the apparatus diminishes in proportion as the level of the liquid drops in the condenser.

The condenser G shown in the accompanying drawings comprises a cylindrical inner vessel G', a cylindrical outer vessel G² and an enveloping internal jacket E positioned near the walls of the inner vessel G'.

The condenser thus comprises a vessel G of cylindrical form and of the same diameter throughout the whole of its height. The outer vessel G² can therefore be formed from a tube without any joints or circular solderings.

The inner vessel may be cylindrical or of other configuration and any suitable means is employed to ensure its contact with the receptacle containing the liquid or the substances to be cooled or frozen and disposed within the vessel.

The jacket E which is as long as possible is arranged in the vessel G spaced from the walls of G' and is held in place by cross ties $e$ of which there may be any number and located in any position. This jacket provides at the top and the bottom, two spaces $g'$ and $g^2$, one for facilitating discharge towards the pipe $c$ and the other for ensuring the renewal of the boiling liqud between the jacket E and the walls of G' during evaporation.

It will be understood that under the effect of the ebullition of the liquid contained in the condenser the annular layer of gas or boiling liquid contained between E and G' will proceed to give rise to intense extraction of calories from the contents of the vessel G' because this cold layer will be protected against external heat and is itself cooled by the annular layer of gas or boiling liquid contained between E and the outer walls of G².

The cold gases have a forced circulation between the jacket E and the walls of the vessel G', during which they play over said walls for the height thereof.

There will therefore be an intense cooling of the inner vessel G' and as the annular layer inside between E and G', extends over the greater part of the height of the vessel G', the exchange of temperature and the cooling will go on whatever be the level of the boiling liquid in the condenser.

Figure 1:
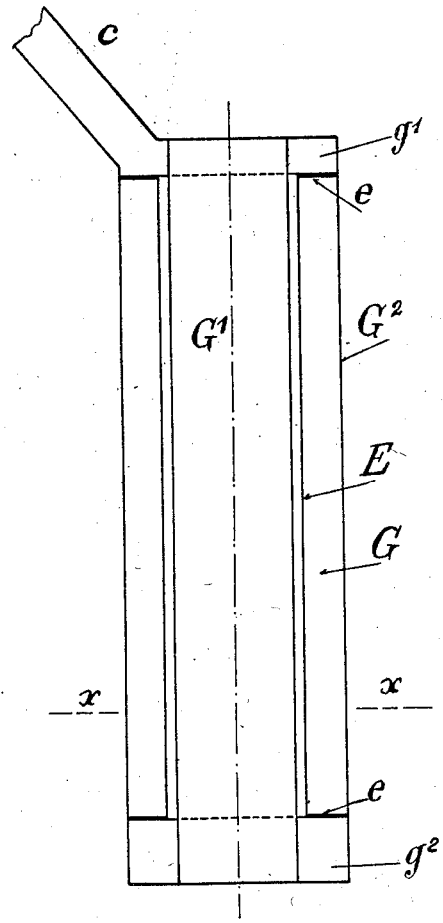
Figure 1 is a diagrammatic sectional elevation of the condenser.
Figures 2, 3:
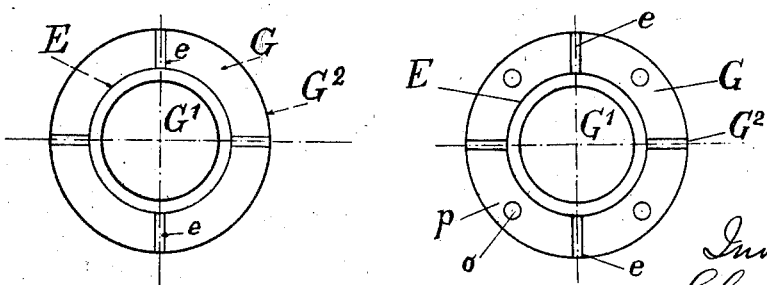
Figure 2 is a transverse section on the line $x$—$x$ of Figure 1.
Figure 3 is a view similar to Figure 2 of a modified construction.

Instead of placing cross ties $e$ in the top of the jacket E to keep it in place it is possible to close the space comprised between E and $G^2$ by an annular plate $p$, having small openings $o$ (see Figure 3). With this construction the evaporation of the liquid between E and $G^2$ will be considerably reduced, but all the gases will be caused to follow the forced circulation between the jacket E and the walls of the vessel $G'$, which is of advantage particularly in the case where the condensers are of large diameter and large internal capacity.

Thus with the constructions represented in the drawings, the exchanges of temperature will take place over the whole of the height of the interior vessel whatever be the level of the liquid in ebullition, and consequently the efficiency of the apparatus is considerably increased, and the formation of the block of ice is more rapid. The construction of the condenser itself is also greatly simplified and its cost proportionately reduced.

When the cooling which is due to the evaporation of the liquefied gas is not intended to affect a small mass which may be contained in a central space within the condenser as above set forth, but is to be produced in a chamber of some size, the gas-producing apparatus may be combined with a condenser as shown in section in Figure 4.

This device comprises a sheet steel casing 1 adapted to withstand the operating pressures due to the gas when liquefied, according to the temperatures at which the process is usually carried out. The said casing is traversed by a tube 2 wherein cold water is circulated in order to further the liquefaction. The gas inlet pipe enters the casing at the point 3 or at any other suitable point, and the discharge pipe at the point 4 returns into the boiler any traces of the absorbent liquid which may have been drawn over during the evaporation of the gas contained in the said liquid. The gas inlet tube must communicate with the condenser at a point adjacent the upper wall of the chamber or within the said wall, and the said chamber must have a sufficient size in order that the level of the liquefied gas shall remain in all cases below the section $3'$ of the said tube.

The condenser as a whole is surrounded by a jacket 5 of a thin metal which is a good conductor of heat, for example of copper, aluminum or the like.

The intermediate space may be provided with a water circulation including the inlet conduit at 6 and the outlet at 7, combined with the circulation through the central tube 2. During the production of cold, this water will be replaced by a non-freezing brine such as salt water, or water containing glycerin, alcohol or the like.

When thus filled, or even when empty, the said jacket will afford protection and insulation against any inflow of hot air upon the condenser, for example when one opens the enclosure in which it is contained and which is cooled thereby.

In order that this double function, i. e. the radiation of cold and the protection against heat, may be of a more reliable nature, a veritable radiator will be formed in the intermediate space, as well as a regulator for the circulation, for example, by means of circulation retarding means such as a spiral partition formed of a thin plate 8 soldered to the outer surface of the chamber 1 and to the inner surface of the jacket 5.

This function of the radiator of cold will be very effective in relation to the outer casing, either with or without the presence of brine in the intervening space. In like manner, said space will afford a good protection against external heating, because when filled, the reserve of cold will act as a protecting jacket, and when empty the time in which the heating effect is exercised is usually too short to offer any appreciable heating by conduction between the outer casing and the inner chamber.

By reason of the water circulation during the period of condensation, there will be no apprehension that the condenser will radiate heat due to the inflow of hot gas condensing therein. Obviously, the brine is not circulated, and it can be admitted through the pipe 7 and optionally evacuated by the pipe 6.

The size of the condenser will depend upon the space to be cooled, and it is feasible to use two or more condensers mounted upon a common gas inlet pipe, these being in series.

The said arrangement is chiefly adapted to afford excellent results for the cooling of refrigerating chambers which will be most advantageously provided with insulated walls.

Having now particularly described and ascertained the nature of my said invention and in what manner the same is to be performed, I declare that what I claim is:—

1. In a refrigerating apparatus of the class described, including an outer vessel, an inner vessel spaced therefrom and open at its opposite ends, an internal jacket surrounding the inner vessel and disposed adjacent to the walls thereof, and means for feeding a cooling medium intermediate the inner vessel and its jacket and said jacket and the outer vessel.

2. In a refrigerating apparatus of the class described, including an outer vessel, an inner vessel spaced therefrom and open at its opposite ends, an internal jacket surrounding the inner vessel and disposed adjacent to the walls thereof, means for feeding a cooling medium intermediate the inner vessel and its jacket and said jacket and the outer vessel, and means at one end for partially closing the space between the jacket and the outer vessel.

3. In a refrigerating apparatus of the class described, a cylindrical outer vessel having opposite heads and an outlet passage at its upper portion, an inner vessel open at its opposite ends and extending through said heads, and a jacket of less length than the inner vessel and surrounding the same to provide a relatively narrow annular space for circulation of a cooling medium.

In testimony whereof I affix my signature.

CHARLES DELAYGUE.